(12) United States Patent
Otaka et al.

(10) Patent No.: US 11,240,862 B2
(45) Date of Patent: Feb. 1, 2022

(54) COMMUNICATION DEVICE, COMPUTER-READABLE STORAGE MEDIUM, COMMUNICATION SYSTEM, AND COMMUNICATION METHOD

(71) Applicant: HONDA MOTOR CO.,LTD., Tokyo (JP)

(72) Inventors: Masaru Otaka, Saitama (JP); Hiroyuki Suzuki, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/821,968

(22) Filed: Mar. 17, 2020

(65) Prior Publication Data

US 2020/0314935 A1 Oct. 1, 2020

(30) Foreign Application Priority Data

Mar. 27, 2019 (JP) .............................. JP2019-061960

(51) Int. Cl.
| | |
|---|---|
| *H04W 76/16* | (2018.01) |
| *H04L 12/707* | (2013.01) |
| *H04L 12/721* | (2013.01) |
| *H04W 88/06* | (2009.01) |

(52) U.S. Cl.
CPC ........... *H04W 76/16* (2018.02); *H04L 45/124* (2013.01); *H04L 45/22* (2013.01); *H04L 45/24* (2013.01); *H04W 88/06* (2013.01)

(58) Field of Classification Search
CPC .... H04W 76/16; H04W 88/06; H04L 45/124; H04L 45/22; H04L 45/24
USPC ......................................... 370/310, 328, 329
See application file for complete search history.

(56) References Cited

U.S. PATENT DOCUMENTS

| 10,212,761 | B2 | 2/2019 | Le | |
|---|---|---|---|---|
| 2011/0286343 | A1* | 11/2011 | Powell | H04W 76/10 370/252 |
| 2016/0135144 | A1* | 5/2016 | Tsai | H04W 52/0251 455/553.1 |
| 2020/0145835 | A1* | 5/2020 | Xu | H04W 88/06 |

FOREIGN PATENT DOCUMENTS

JP        2018517341 A       6/2018

* cited by examiner

*Primary Examiner* — Obaidul Huq (57) ABSTRACT

Provided is a communication device capable of performing Internet communication by any of a first wireless communication method and a second wireless communication method. The communication device comprises a communication performing unit for performing the Internet communication by combined communication in combination of the first wireless communication method and the second wireless communication method, in accordance with establishment of a predetermined condition.

21 Claims, 7 Drawing Sheets

COMMUNICATION DEVICE, COMPUTER-READABLE STORAGE MEDIUM, COMMUNICATION SYSTEM, AND COMMUNICATION METHOD

The contents of the following Japanese patent application are incorporated herein by reference: 2019-061960 filed in JP on Mar. 27, 2019

BACKGROUND

1. Technical Field

The present invention relates to a communication device, a computer-readable storage medium, a communication system, and a communication method.

2. Related Art

Known is a communication device capable of performing Internet communication by any of different wireless communication methods such as cellular communication and WiFi (registered trademark) communication (for example, refer to Patent Document 1).

CITATION LIST

Patent Document

Patent Document 1: Japanese Patent Application Publication No. 2018-517341

SUMMARY OF INVENTION

Technical Problem

It is preferably to implement the Internet communication in a method appropriate for a user of a communication device.

BRIEF DESCRIPTION OF DRAWINGS

FIG. 2 schematically shows an example of a process flow that is performed by the communication device 300 when combined communication is set to on.

FIG. 4 schematically shows an example of a process flow that is performed by the communication device 300 when WiFi communication is set to on.

FIG. 5 schematically shows an example of a process flow that is performed by the communication device 300 when the WiFi communication is set to on.

DESCRIPTION OF EXEMPLARY EMBODIMENTS

Hereinbelow, embodiments of the present invention will be described. However, the embodiments do not limit the invention defined in the claims. Also, all combinations of features described in the embodiments are not necessarily essential to solving means of the invention.

Figure 1:
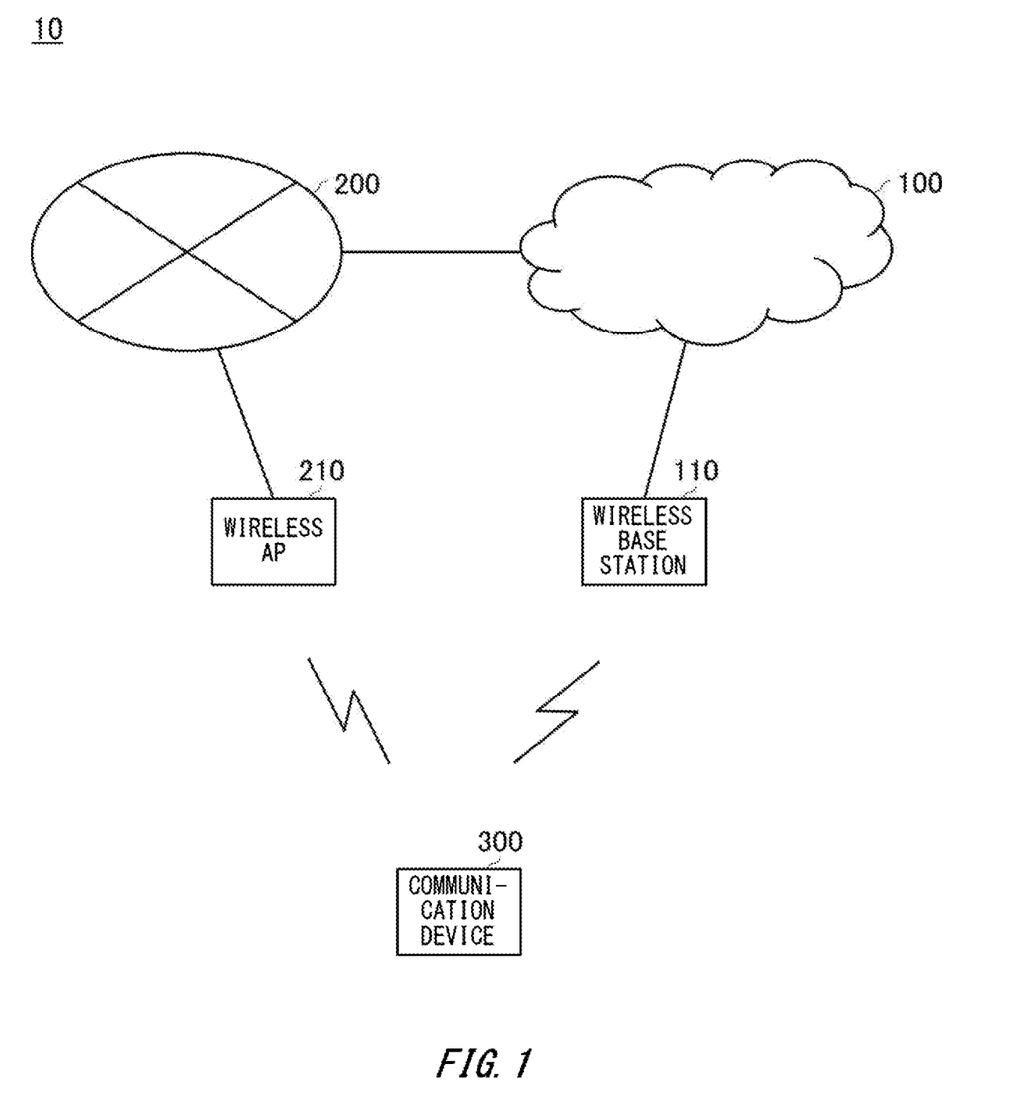
FIG. 1 schematically shows an example of a communication environment of a communication device 300.

FIG. 1 schematically shows an example of a communication environment of a communication device 300. The communication device 300 according to this embodiment can perform Internet communication by any of a first wireless communication method and a second wireless communication method. The communication device 300 performs the Internet communication by combined communication in combination of the first wireless communication method and the second wireless communication method, in accordance with establishment of a predetermined condition. The communication device 300 may be an example of a communication means.

The first wireless communication method and the second wireless communication method are different from each other, in terms of communication costs, for example. For example, the communication cost per unit traffic by the first wireless communication method is higher than the communication cost per unit traffic by the second wireless communication method. The communication cost by the first wireless communication method may be charged, and the communication cost by the second wireless communication method may be free. In a situation where both the first wireless communication method and the second wireless communication method can be performed, the communication device 300 is configured to perform Internet communication by the combined communication when a combination permission setting for permitting the combined communication to be performed is enabled, and to perform the Internet communication by the second wireless communication method when the combination permission setting is disabled, for example. Thereby, for example, when a user of the communication device 300 wants to increase a communication speed even though the communication cost increases, the user can enable the combination permission setting, and when the user wants to reduce the communication cost even though the communication speed is slow somewhat, the user disable the combination permission setting. Accordingly, it is possible to implement the Internet communication appropriate for the user.

Also, for example, the first wireless communication method and the second wireless communication method may differ in that they are a wireless communication method using a licensed band or a wireless communication method using an unlicensed band. For example, the first wireless communication method is a wireless communication method using a licensed band, and the second wireless communication method is a wireless communication method using an unlicensed band. As a specific example, the first wireless communication method may be a wireless communication method using a cellular communication method, and the second wireless communication method may be a wireless communication method using a WiFi communication method.

Herein, an example in which the first wireless communication method is the cellular communication method and the second wireless communication method is the WiFi communication method is mainly described. The communication device 300 is, for example, a mobile phone such as a smart phone. The communication device 300 may be a tablet terminal. The communication device 300 may be a PC (Personal Computer). The communication device 300 may also be, for example, a wearable terminal, an IoT (Internet of Thing) terminal or the like, provided that it can perform the Internet communication by any of the cellular communication method and the WiFi communication method.

The communication device 300 accesses the Internet 200 via a wireless base station 110 and a core network 100, thereby performing the Internet communication by the cellular communication method. The method of the cellular communication may be any communication method of a 3G (3rd Generation) communication method, an LTE (Long Term Evolution) communication method, a 5G (5th Generation) communication method, and a 6G (6th Generation) communication method and beyond. In the case of the LTE communication method, the wireless base station 110 may be an eNB (eNodeB). In the case of the 5G communication method, the wireless base station 110 may be a gNB (gNodeB).

The communication device 300 accesses the Internet 200 via a wireless AP (Access Point) 210, thereby performing the Internet communication by the WiFi communication method. The wireless AP 210 may be an example of a relay means for relaying communication between the communication device 300 and the Internet 200 by using the WiFi communication method. A communication standard of the WiFi communication may be any WiFi communication standard.

In the present embodiment, a communication system 10 according to this embodiment, including the wireless base station 110, the wireless AP 210 and the communication device 300, enables the Internet communication by the communication device 300 to be performed by combined communication in combination of the cellular communication method and the WiFi communication method. The combined communication in combination of the cellular communication method and the WiFi communication method may also be referred to as carrier aggregation of the cellular communication method and the WiFi communication method.

When the wireless AP 210 is located under the core network 100, communication via the wireless base station 110 and communication via the wireless AP 210 by the communication device 300 can be managed and synchronized by the core network 100. However, since many wireless APs 210 currently installed in various places are not located under the core network 100, it is preferably to implement the combined communication using the wireless AP 210 being not located under the core network 100.

In the communication system 10 according to this embodiment, for example, the communication device 300 transmits base station identification information for identifying the wireless base station 110, whose coverage area the communication device 300 is located in, to the core network 100 to which the wireless base station 110 belongs, via the Internet communication by the WiFi communication method. The base station identification information may be an eNB ID, a PCI (Physical Cell ID) or the like and may also be any information provided that it is capable of identifying the wireless base station 110.

The communication device 300 may transmit, by an IP layer, synchronization information to the core network 100 via the wireless AP 210 and the Internet 200. The communication device 300 may separately transmit a plurality of packets by the cellular communication method via the wireless base station 110 and by the WiFi communication method via the wireless AP 210. In this way, the synchronization at the IP layer is performed, so that the combined communication in combination of the cellular communication method via the wireless base station 110 and the WiFi communication method via the wireless AP 210 not located under the core network 100 can be implemented.

In the setting for the Internet communication in an existing smart phone and the like, an on/off setting for the WiFi communication is set. When the WiFi communication is set to off, a smart phone or the like performs the Internet communication by the cellular communication method. When the WiFi communication is set to on, a smart phone or the like performs the Internet communication by the WiFi communication method in a situation where the WiFi communication can be performed, and performs the Internet communication by the cellular communication method in a situation where the WiFi communication cannot be performed.

In general, the WiFi communication is not charged and cellular communication is charged. Therefore, a user who wants to reduce the communication cost tends to set the WiFi communication to on. When the WiFi communication is set to on, the Internet communication can be performed without being charged. However, when the communication speed of the WiFi communication is relatively slow, a quality of experience may be lowered. For example, for so-called free WiFi spot and the like, the communication speed of the WiFi communication may be relatively slow.

The communication device 300 according to this embodiment performs the Internet communication by combined communication in combination of the cellular communication method and the WiFi communication method, in accordance with establishment of a predetermined condition. The communication device 300 performs the Internet communication by the combined communication when the combination permission setting for permitting the user of the communication device 300 to perform the combined communication is enabled, for example. According to the combined communication, in a situation where the communication speed of the WiFi communication is relatively slow, the communication speed can be increased, as compared to a case where only the WiFi communication is used, so that it is possible to suppress the quality of experience from being lowered.

The communication device 300 receives an on/off setting for the combined communication set by the user of the communication device 300, for example. When the combined communication is set to off, the communication device 300 performs the Internet communication by the cellular communication method. When the combined communication is set to on, i.e., when the combination permission setting is enabled, the communication device 300 performs the Internet communication by the combined communication when the WiFi communication can be performed, and performs the Internet communication by the cellular communication method when the WiFi communication cannot be performed.

Figure 2:
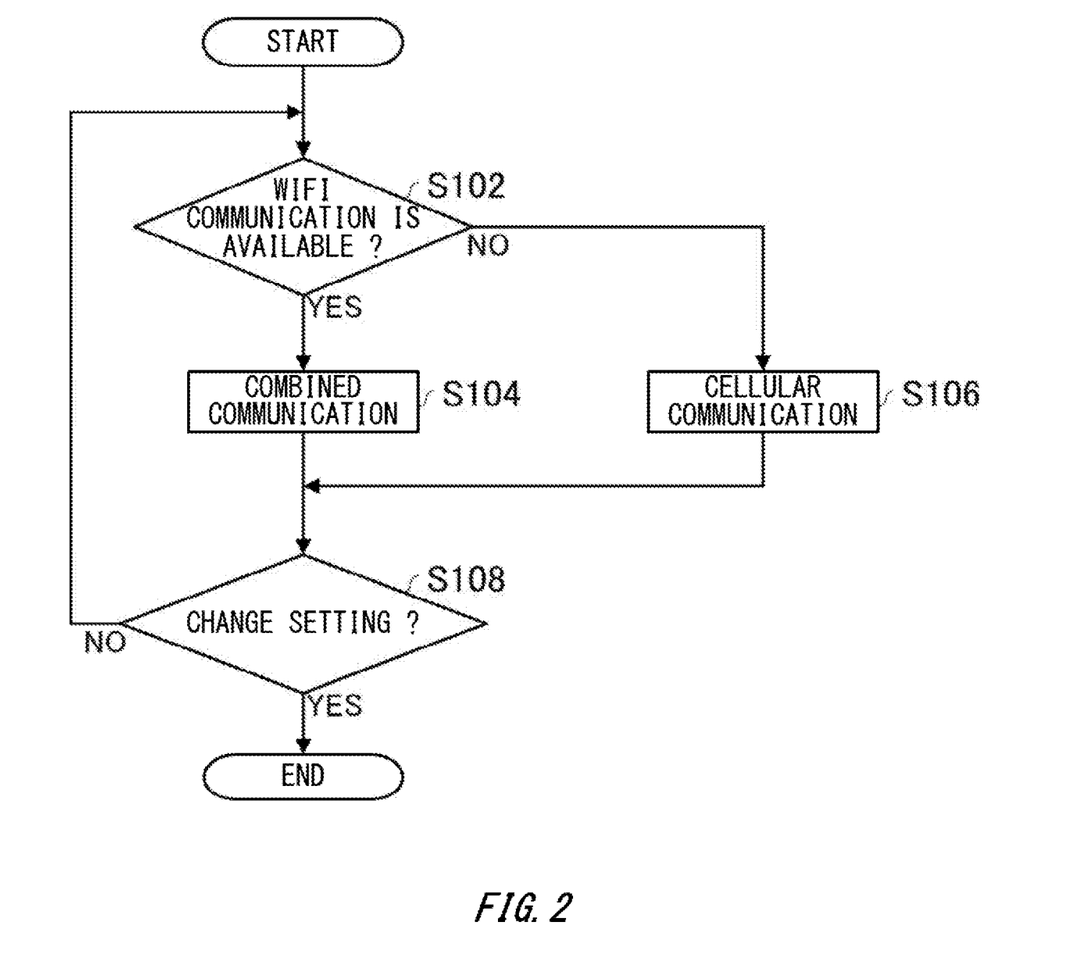

FIG. 2 schematically shows an example of a process flow that is performed by the communication device 300 when the combined communication is set to on (that is, when a mode in which the combined communication is permitted is used). This process flow starts when the communication device 300 performs the Internet communication. Each process shown in FIG. 2 is mainly performed by a control unit included in the communication device 300.

In step (the step may be abbreviated as 'S') 102, it is determined whether it is possible to perform the WiFi communication. The determination has the same meaning as the determination as to whether it is possible to perform the Internet communication by using the WiFi communication. Also, the determination may have the same meaning as the determination as to whether it is possible to perform the Internet communication without using the cellular communication and by using the WiFi communication. If the determination is yes, the flow proceeds to S104, and otherwise proceeds to S106.

In S104, the Internet communication is performed by the combined communication. In S106, the Internet communication is performed by the cellular communication method.

In S108, it is determined whether the setting for the Internet communication has been changed. When a result of the determination is negative, the flow returns to S102, and otherwise ends.

When the combined communication is set to on, the communication device 300 may switch between the WiFi communication and the combined communication, in accordance with the communication speed (which may also be referred to as the WiFi communication speed) of the Internet communication by the WiFi communication. The WiFi communication speed may be anything, provided that it is indicative of a communication speed of the Internet communication by the WiFi communication. For example, the communication device 300 defines a speed of transmission confirmation at the user layer as the WiFi communication speed. Also, for example, the communication device 300 may use a known application or the like for measuring the WiFi communication speed.

The communication device 300 performs the Internet communication by the combined communication when the WiFi communication speed is slower than a preset setting speed, and performs the Internet communication by the WiFi communication method when the WiFi communication speed is faster than the setting speed.

The setting speed is set by the user of the communication device 300, for example. The user can set the communication speed within an allowable range for the user, for example. Thereby, the WiFi communication is performed as long as the communication speed is within the allowable range, and the combined communication is performed when the communication speed is lowered beyond the allowable range. The user may desire to use the WiFi communication when the communication speed is to some extent fast, and to use the combined communication when the communication speed is slower than that speed even though the user will be charged partly. In this case, it is possible to meet the user's desire.

Also, as the setting speed, the communication speed (which may also be referred to as 'combined communication speed') of the Internet communication by the combined communication method may be set. The setting is performed by the communication device 300, for example. The communication device 300 may measure a combined communication speed to set the measurement result as the setting speed. Thereby, it is possible to perform communication by faster communication speed of the combined communication and the WiFi communication. The user may desire faster communication speed, irrespective of whether the user is charged or not. In this case, it is possible to meet the user's desire.

The communication device 300 may receive a setting as to whether to give priority to the communication speed when the combined communication is set to on, along with the on/off setting for the combined communication. In a case where a communication speed priority setting is set, and in a situation where the WiFi communication can be performed, the communication device 300 performs the Internet communication by the combined communication when the combined communication speed is faster than the WiFi communication speed, and performs the Internet communication by the WiFi communication method when the combined communication speed is slower than the WiFi communication speed. In a case where the communication speed priority setting is not set, the communication device 300 may perform the Internet communication by the combined communication in a situation where the WiFi communication can be performed.

Figure 3:
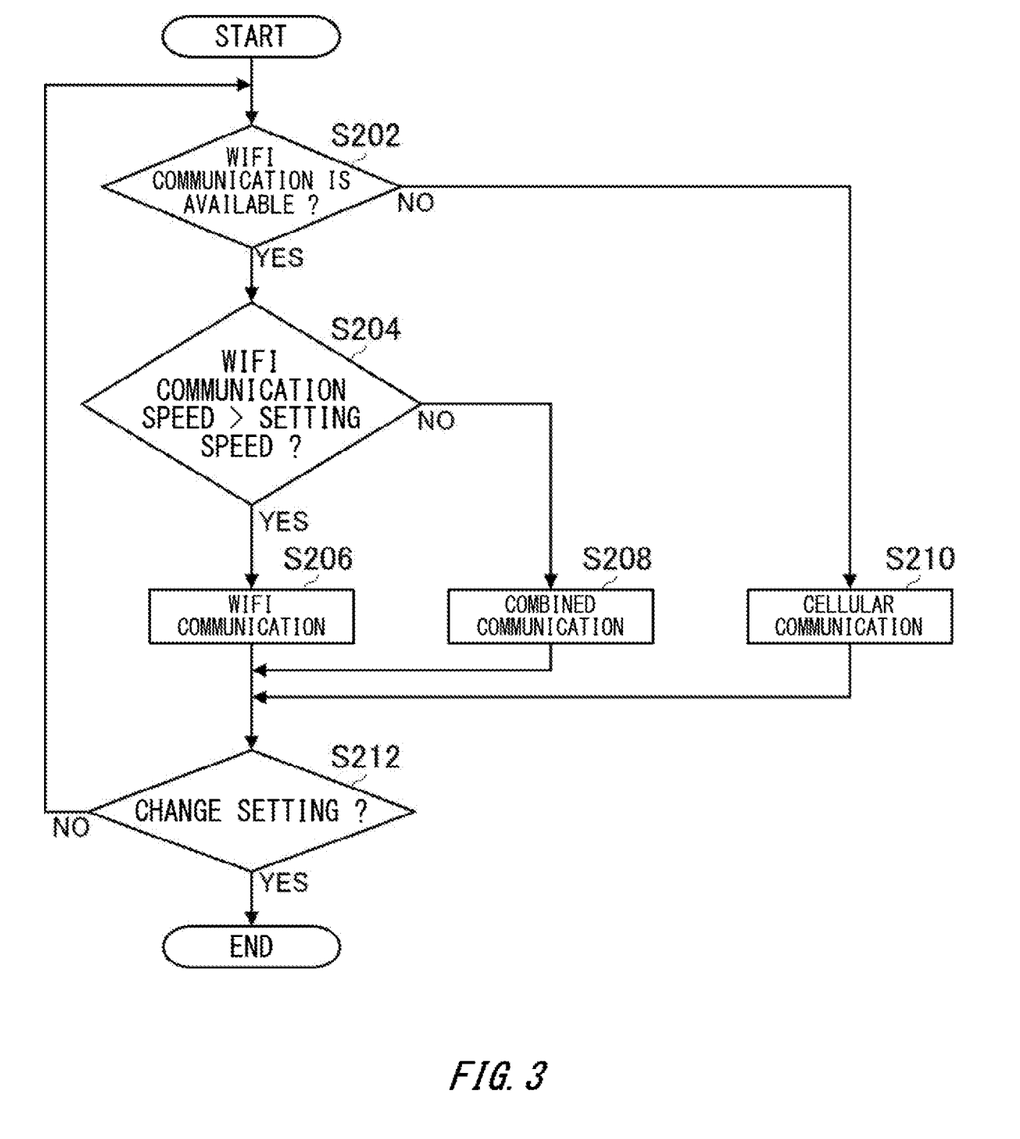
FIG. 3 schematically shows an example of a process flow that is performed by the communication device 300 when combined communication is set to on and a communication speed priority setting is set.

FIG. 3 schematically shows an example of a process flow that is performed by the communication device 300 when the combined communication is set to on and the communication speed priority setting is set (that is, when a mode in which the combined communication is permitted and the communication speed is given priority to is used). This process flow starts when the communication device 300 performs the Internet communication. Each process shown in FIG. 3 is mainly performed by the control unit included in the communication device 300.

In S202, it is determined whether it is possible to perform the WiFi communication. The determination is the same as determination as to whether it is possible to perform the Internet communication by using the WiFi communication. Also, the determination may be the same as determination as to whether it is possible to perform the Internet communication by using the WiFi communication without using the cellular communication. If the determination is yes, the flow proceeds to S204, and otherwise proceeds to S210.

In S204, it is determined whether the WiFi communication speed is faster than the setting speed. The setting speed may be the combined communication speed. If the determination is yes, the flow proceeds to S206, and otherwise proceeds to S208.

In S206, the Internet communication is performed by the WiFi communication method. In S208, the Internet communication is performed by the combined communication.

In S210, the Internet communication is performed by the cellular communication method. In S212, it is determined whether the setting for the Internet communication has been changed. When a result of the determination is negative, the flow returns to S202, and otherwise ends.

The communication device 300 may perform the process flow shown in FIG. 3 when the setting whether or not to give priority to the communication speed is not received. In this case, when it is determined in S204 that the WiFi communication speed is faster than the setting speed, the communication device 300 may notify the user of the communication device 300 that the Internet communication will be performed by the WiFi communication, and then perform the Internet communication by the WiFi communication. Thereby, it is possible to make the user, who thinks that the combined communication is performed, recognize that the WiFi communication is performed.

In a situation where the on/off setting for the WiFi communication is set (that is, in a situation a mode in which the combined communication is not permitted is used), when the WiFi communication speed is slower than the setting speed, the communication device 300 may recommend the user to perform the combined communication, and receive the setting for the combined communication.

Figure 4:
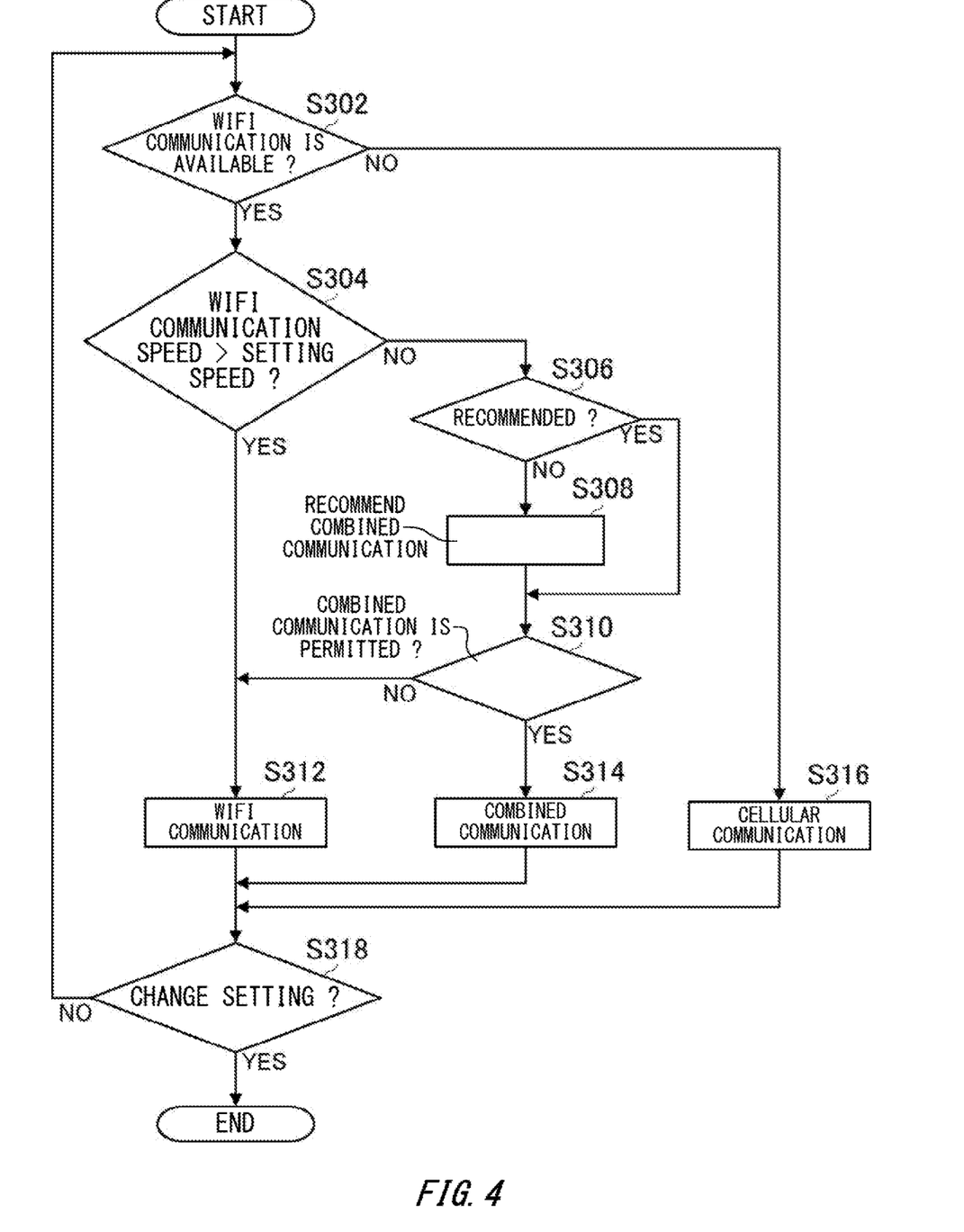

FIG. 4 schematically shows an example of a process flow that is performed by the communication device 300 when the WiFi communication is set to on (that is, when a mode in which the combined communication is not permitted is used). This process flow starts when the communication device 300 performs the Internet communication. Each process shown in FIG. 4 is mainly performed by the control unit included in the communication device 300.

In S302, it is determined whether it is possible to perform the WiFi communication. The determination is the same as determination as to whether it is possible to perform the Internet communication by using the WiFi communication. Also, the determination may be the same as determination as to whether it is possible to perform the Internet communication by using the WiFi communication without using the cellular communication. If the determination is yes, the flow proceeds to S304, and otherwise proceeds to S316.

In S304, it is determined whether the WiFi communication speed is faster than the setting speed. If the determination is yes, the flow proceeds to S312, and otherwise proceeds to S306.

In S306, it is determined whether the combined communication has been already recommended to the user. When a result of the determination is negative, the flow proceeds to S308, and otherwise proceeds to S310. In S308, the combination permission setting is recommended to the user. The communication device 300 displays and outputs recommendation information for recommending the combination permission setting, for example. Also, the communication device 300 may output recommendation information for recommending the combination permission setting by voice. The user may enable the combination permission setting, in accordance with the combination permission setting recommended by the communication device 300.

In S310, it is determined whether the combination permission setting is enabled. If the determination is yes, the flow proceeds to S314, and otherwise proceeds to S312.

In S312, the Internet communication is performed by the WiFi communication method. In S314, the Internet communication is performed by the combined communication. In 316, the Internet communication is performed by the cellular communication method.

In S318, it is determined whether the setting for the Internet communication has been changed. When a result of the determination is negative, the flow returns to S302, and otherwise ends.

The communication device 300 may receive the on/off setting for the WiFi communication and the on/off setting for the combined communication when the WiFi communication is set to on. When the WiFi communication is set to off, the communication device 300 performs the Internet communication by the cellular communication method. In a situation where the WiFi communication is set to on and the combined communication is set to on, the communication device 300 performs the Internet communication by the combined communication when the WiFi communication can be performed, and performs the Internet communication by the cellular communication method when the WiFi communication cannot be performed. In a situation where the WiFi communication is set to on and the combined communication is set to off, the communication device 300 performs the Internet communication by the WiFi communication method when the WiFi communication can be performed, and performs the Internet communication by the cellular communication method when the WiFi communication cannot be performed.

Figure 5:
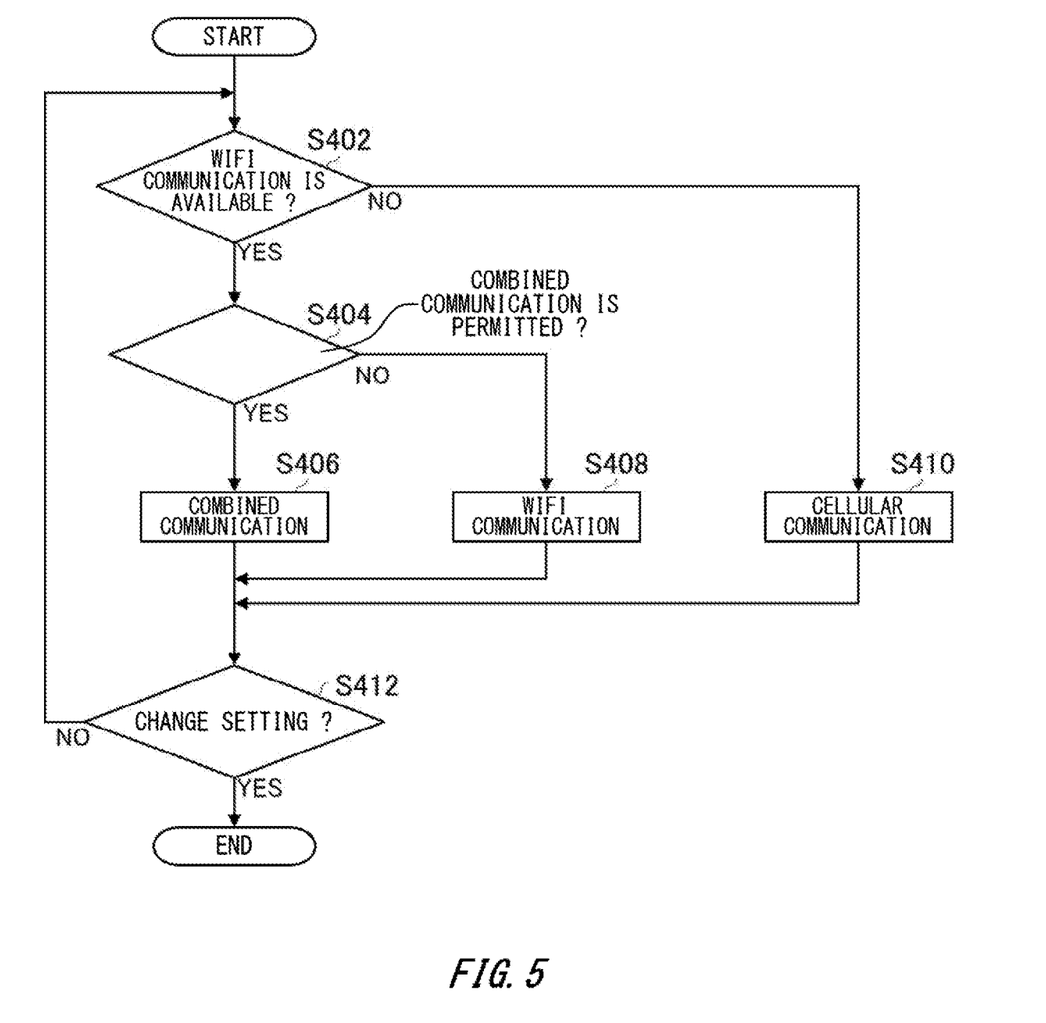

FIG. 5 schematically shows an example of a process flow that is performed by the communication device 300 when the WiFi communication is set to on (that is, when a mode in which the WiFi communication is permitted is used). This process flow starts when the communication device 300 performs the Internet communication. Each process shown in FIG. 5 is mainly performed by the control unit included in the communication device 300.

In S402, it is determined whether it is possible to perform the WiFi communication. The determination is the same as determination as to whether it is possible to perform the Internet communication by using the WiFi communication. Also, the determination may be the same as determination as to whether it is possible to perform the Internet communication by using the WiFi communication without using the cellular communication. If the determination is yes, the flow proceeds to S404, and otherwise proceeds to S410.

In S404, it is determined whether the combination permission setting is enabled. If the determination is yes, the flow proceeds to S406, and otherwise proceeds to S408.

In S406, the Internet communication is performed by the combined communication. In S408, the Internet communication is performed by the WiFi communication method. In S410, the Internet communication is performed by the cellular communication method.

In S412, it is determined whether the setting for the Internet communication has been changed. When a result of the determination is negative, the flow returns to S402, and otherwise ends.

Figure 6:
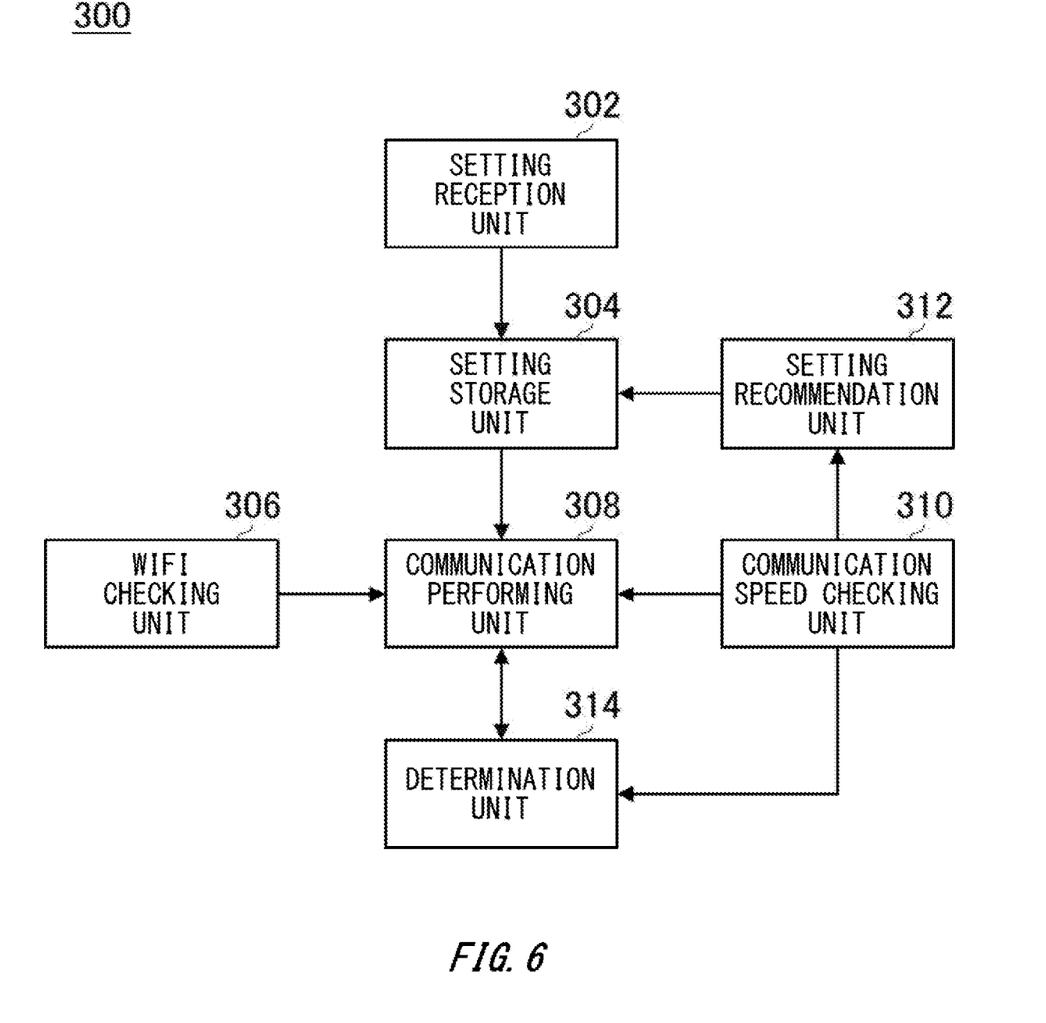
FIG. 6 shows an example of a functional configuration of the communication device 300.

FIG. 6 shows an example of a functional configuration of the communication device 300. The communication device 300 includes a setting reception unit 302, a setting storage unit 304, a WiFi checking unit 306, a communication performing unit 308, a communication speed checking unit 310, a setting recommendation unit 312, and a determination unit 314. In the meantime, the communication device 300 is not necessarily required to have all these configurations.

The setting reception unit 302 receives a setting for Internet communication. The setting reception unit 302 may receive a setting set by the user of the communication device 300.

The setting reception unit 302 receives an on/off setting for combined communication, for example. The setting reception unit 302 may also receive a setting as to whether to give priority to the communication speed when the combined communication is set to on, in addition to the on/off setting for the combined communication.

The setting reception unit 302 may receive an on/off setting for WiFi communication. The setting reception unit 302 may receive the on/off setting for WiFi communication and the on/off setting for the combined communication when the WiFi communication is set to on.

In the setting storage unit 304, contents of the setting for Internet communication received by the setting reception unit 302 are stored.

The WiFi checking unit 306 determines whether it is possible to perform WiFi communication. The determination is the same as determination as to whether it is possible to perform the Internet communication by using the WiFi communication. Also, the determination may be the same as determination as to whether it is possible to perform the Internet communication by using the WiFi communication without using the cellular communication. The WiFi checking unit 306 determines that it is possible to perform the WiFi communication, when wireless communication connection to the wireless AP 210 can be established, for example. Also, the WiFi checking unit 306 determines that the WiFi communication cannot be performed, when wireless communication connection to the wireless AP 210 cannot be established or when the wireless AP 210 cannot be found, for example.

The communication performing unit 308 performs Internet communication. The communication performing unit 308 can perform Internet communication by the cellular communication method. The Internet communication by the cellular communication method may be Internet communication using the cellular communication method, not the combined communication. The Internet communication by the cellular communication method may be Internet communication using only the cellular communication method. The communication performing unit 308 can perform Internet communication by the WiFi communication method. The Internet communication by the WiFi communication method may be Internet communication using the cellular communication method, not the combined communication. The Internet communication by the WiFi communication method may be Internet communication using only the WiFi communication method. The communication performing unit 308 can perform Internet communication by the combined communication.

When performing Internet communication by the combined communication, the communication performing unit 308 transmits synchronization information to the core network 100 via the wireless AP 210 and the Internet 200 at the IP layer, for example. The communication performing unit 308 separately transmits a plurality of packets by the cellular communication method via the wireless base station 110 and by the WiFi communication method via the wireless AP 210.

The communication performing unit 308 performs Internet communication by the combined communication, in accordance with establishment of a predetermined condition. The communication performing unit 308 performs Internet communication by the combined communication when the combination permission setting is enabled by the user of the communication device 300, for example. The communication performing unit 308 may perform Internet communication by the WiFi communication method when the combination permission setting is disabled.

For example, in a case where the on/off setting for the combined communication is stored in the setting storage unit 304, the communication performing unit 308 performs the Internet communication by the cellular communication method when the combined communication is set to off. In a situation where the combined communication is set to on, the communication performing unit 308 performs the Internet communication by the combined communication when the WiFi communication can be performed, and performs the Internet communication by the cellular communication method when the WiFi communication cannot be performed.

For example, in a case where the on/off setting for the WiFi communication, and the on/off setting for the combined communication when the WiFi communication is set to on are stored in the setting storage unit 304, the communication performing unit 308 performs the Internet communication by the cellular communication method when the WiFi communication is set to off. In a situation where the WiFi communication is set to on and the combined communication is set to on, the communication performing unit 308 performs the Internet communication by the combined communication when the WiFi communication can be performed, and performs the Internet communication by the cellular communication method when the WiFi communication cannot be performed. In a situation where the WiFi communication is set to on and the combined communication is set to off, the communication performing unit 308 performs the Internet communication by the WiFi communication method when the WiFi communication can be performed, and performs the Internet communication by the cellular communication method when the WiFi communication cannot be performed.

The communication speed checking unit 310 checks a communication speed of the Internet communication performed by the WiFi communication method. Also, the communication speed checking unit 310 checks a communication speed of the Internet communication performed by the combined communication.

In a case where the on/off setting for the combined communication is stored in the setting storage unit 304, if the combined communication is set to on, the communication performing unit 308 may perform the Internet communication by the combined communication when the WiFi communication speed is slower than a predetermined speed, and may perform the Internet communication by the WiFi communication method when the WiFi communication speed is faster than the predetermined speed.

In a case where the on/off setting for the combined communication is stored in the setting storage unit 304, when the WiFi communication speed is slower than the predetermined speed, the setting recommendation unit 312 recommends the combination permission setting to the user. The setting reception unit 302 may receive the combination permission setting performed by the user in accordance with the combination permission setting recommended by the setting recommendation unit 312.

In a case where the on/off setting for the combined communication is stored in the setting storage unit 304, if the combined communication is set to on, when the WiFi communication speed is faster than the predetermined speed, the determination unit 314 determines, by inquiring the user, whether to perform the Internet communication by the WiFi communication method. When it is determined by the determination unit 314 that the Internet communication is to be performed by the WiFi communication method, the communication performing unit 308 may perform the Internet communication by the WiFi communication method.

The setting reception unit 302 may also receive a setting as to whether to give priority to the communication speed when the combined communication is set to on, in addition to the on/off setting for the combined communication. In a situation where the combined communication is set to on and the setting for giving priority to the communication speed is enabled, the communication performing unit 308 may perform the Internet communication by the WiFi communication method when the WiFi communication speed is faster than the predetermined speed, and may perform the Internet communication by the combined communication when the WiFi communication speed is slower than the predetermined speed. In a situation where the combined communication is set to on and the setting for giving priority to the communication speed is disabled, the communication performing unit 308 may perform the Internet communication by the combined communication at the time when the WiFi communication can be performed.

Figure 7:
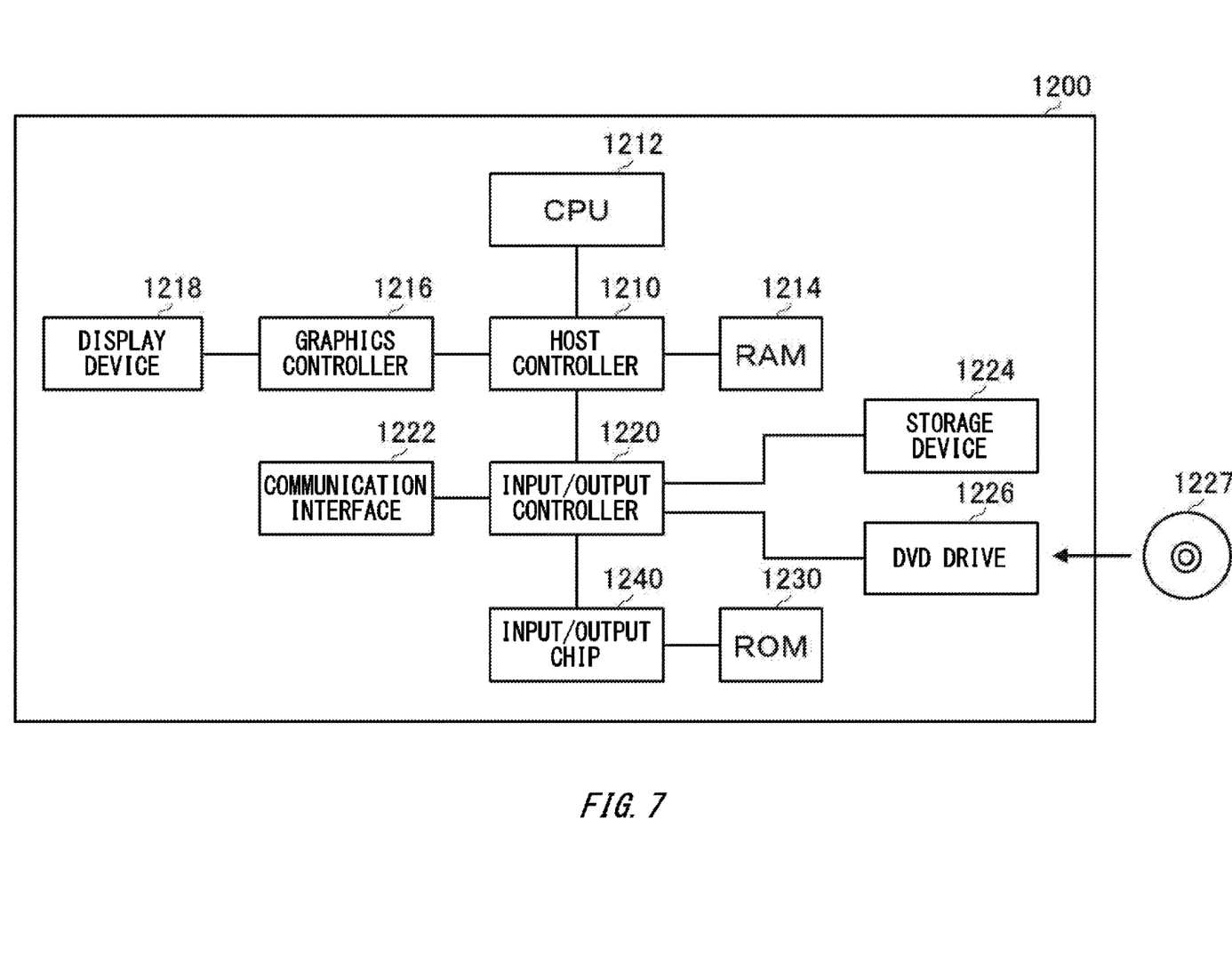
FIG. 7 schematically shows an example of a hardware configuration of a computer 1200 functioning as the communication device 300.

FIG. 7 schematically shows an example of a hardware configuration of a computer 1200 functioning as the communication device 300. A program that is installed in the computer 1200 can cause the computer 1200 to function as one or more "units" in an apparatus of the embodiment, or to cause the computer 1200 to perform operations associated with the apparatus of the embodiment or the one or more "units" thereof, and/or cause the computer 1200 to perform processes of the embodiment or steps thereof. Such a program may be performed by a CPU 1212 so as to cause the computer 1200 to perform certain operations associated with some or all of the blocks of flowcharts and block diagrams described herein.

The computer 1200 in accordance with this embodiment includes a CPU 1212, a RAM 1214, and a graphics controller 1216, which are mutually connected by a host controller 1210. The computer 1200 also includes input/output units such as a communication interface 1222, a storage device 1224, a DVD drive 1226 and an IC card drive, which are connected to the host controller 1210 via an input/output controller 1220. The DVD drive 1226 may be a DVD-ROM drive, a DVD-RAM drive, and the like. The storage device 1224 may be a hard disk drive, a solid-state drive, and the like. The computer 1200 also includes legacy input/output units such as a ROM 1230 and a touch panel, which are connected to the input/output controller 1220 via an input/output chip 1240.

The CPU 1212 operates according to programs stored in the ROM 1230 and the RAM 1214, thereby controlling each unit. The graphics controller 1216 obtains image data generated by the CPU 1212 on a frame buffer or the like provided in the RAM 1214 or in itself, and causes the image data to be displayed on a display device 1218. The computer 1200 may not include the display device 1218, in which case the graphics controller 1216 causes the image data to be displayed on an external display device.

The communication interface 1222 communicates with other electronic devices via a wireless communication network. The storage device 1224 stores programs and data used by the CPU 1212 within the computer 1200. The DVD drive 1226 reads the programs or the data from the DVD-ROM 1227 or the like, and provides the storage device 1224 with the programs or the data. The IC card drive reads programs and data from an IC card, and/or writes programs and data into the IC card.

The ROM 1230 stores therein a boot program or the like performed by the computer 1200 at the time of activation, and/or a program depending on the hardware of the computer 1200. The input/output chip 1240 may also connect various input/output units via a USB port and the like to the input/output controller 1220.

A program is provided by computer-readable storage media such as the DVD-ROM 1227 or the IC card. The program is read from the computer-readable storage media, installed into the storage device 1224, RAM 1214, or ROM 1230, which are also examples of computer-readable storage media, and performed by the CPU 1212. The information processing described in these programs is read into the computer 1200, resulting in cooperation between a program and the above-mentioned various types of hardware resources.
An apparatus or method may be constituted by realizing the operation or processing of information in accordance with the usage of the computer 1200.

For example, when communication is performed between the computer 1200 and an external device, the CPU 1212 may perform a communication program loaded onto the RAM 1214 to instruct communication processing to the communication interface 1222, based on the processing described in the communication program. The communication interface 1222, under control of the CPU 1212, reads transmission data stored on a transmission buffer region provided in a recording medium such as the RAM 1214, the storage device 1224, the DVD-ROM 1227, or the IC card, and transmits the read transmission data to a network or writes reception data received from a network to a reception buffer region or the like provided on the recording medium.

In addition, the CPU 1212 may cause all or a necessary portion of a file or a database to be read into the RAM 1214, the file or the database having been stored in an external recording medium such as the storage device 1224, the DVD drive 1226 (DVD-ROM 1227), the IC card, etc., and perform various types of processing on the data on the RAM 1214. The CPU 1212 may then write back the processed data to the external recording medium.

Various types of information, such as various types of programs, data, tables, and databases, may be stored in the recording medium to undergo information processing. The CPU 1212 may perform various types of processing on the data read from the RAM 1214, which includes various types of operations, information processing, condition judging, conditional branch, unconditional branch, search/replace of information, etc., as described throughout this disclosure and designated by an instruction sequence of programs, and writes the result back to the RAM 1214. In addition, the CPU 1212 may search for information in a file, a database, etc., in the recording medium. For example, when a plurality of entries, each having an attribute value of a first attribute associated with an attribute value of a second attribute, are stored in the recording medium, the CPU 1212 may search for an entry matching the condition whose attribute value of the first attribute is designated, from among the plurality of entries, and read the attribute value of the second attribute stored in the entry, thereby obtaining the attribute value of the second attribute associated with the first attribute satisfying the predetermined condition.

The above-explained program or software modules may be stored in the computer-readable storage media on the computer 1200 or near the computer 1200. In addition, a recording medium such as a hard disk or a RAM provided in a server system connected to a dedicated communication network or the Internet can be used as the computer-readable storage media, thereby providing the program to the computer 1200 via the network.

Blocks in flowcharts and block diagrams in the above embodiments may represent steps of processes in which operations are performed or "units" of apparatuses responsible for performing operations. Certain steps and "units" may be implemented by dedicated circuitry, programmable circuitry supplied with computer-readable instructions stored on computer-readable storage media, and/or processors supplied with computer-readable instructions stored on computer-readable storage media. Dedicated circuitry may include digital and/or analog hardware circuits and may include integrated circuits (IC) and/or discrete circuits. Programmable circuitry may include reconfigurable hardware circuits comprising, for example, logical AND, logical OR, exclusive OR (XOR), negative AND (NAND), negative OR (NOR), and other logical operations, flip-flops, registers, and memory elements, such as field-programmable gate arrays (FPGA), programmable logic arrays (PLA), etc.

Computer-readable storage media may include any tangible device that can store instructions executed by a suitable device, such that the computer-readable storage medium having instructions stored therein comprises an article of manufacture including instructions which can be performed to create means for performing operations specified in the flowcharts or block diagrams. Examples of computer-readable storage media may include an electronic storage medium, a magnetic storage medium, an optical storage medium, an electromagnetic storage medium, a semiconductor storage medium, etc. More specific examples of computer-readable storage media may include a floppy (registered trademark) disk, a diskette, a hard disk, a random access memory (RAM), a read-only memory (ROM), an erasable programmable read-only memory (EPROM or Flash memory), an electrically erasable programmable read-only memory (EEPROM), a static random access memory (SRAM), a compact disc read-only memory (CD-ROM), a digital versatile disk (DVD), a Blu-ray(registered trademark) disc, a memory stick, an integrated circuit card, etc.

Computer-readable instructions may include any of assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, Java (registered trademark), C++, etc., and conventional procedural programming languages, such as the "C" programming language or similar programming languages.

Computer-readable instructions may be provided to a processor of a general purpose computer, special purpose computer, or other programmable data processing apparatus, or to programmable circuitry, locally or via a local area network (LAN), wide area network (WAN) such as the Internet, etc., so that the processor of the general purpose computer, special purpose computer, or other programmable data processing apparatus, or the programmable circuitry performs the computer-readable instructions to create means for performing operations specified in the flowcharts or block diagrams. Examples of processors include computer processors, processing units, microprocessors, digital signal processors, controllers, microcontrollers, etc.

While the present invention has been described by using the embodiments, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

EXPLANATION OF REFERENCES

10: system, 100: core network, 110: wireless base station, 200: Internet, 210: wireless AP, 300: communication device, 302: setting reception unit, 304: setting storage unit, 306: WiFi checking unit, 308: communication performing unit, 310: communication speed checking unit, 312: setting recommendation unit, 314: determination unit, 1200: computer, 1210: host controller, 1212: CPU, 1214: RAM, 1216: graphics controller, 1218: display device, 1220: input/output controller, 1222: communication interface, 1224: storage device, 1226: DVD drive, 1227: DVD-ROM, 1230: ROM, 1240: input/output chip

What is claimed is:

1. A communication device capable of performing Internet communication by any of a first wireless communication method and a second wireless communication method, the communication device comprising:

a communication performing unit for performing the Internet communication by combined communication of the first wireless communication method and the second wireless communication method, in accordance with establishment of a predetermined condition, wherein in a case where a combination permission setting is enabled,
the communication performing unit performs the Internet communication by the combined communication when a communication speed of the Internet communication performed by the second wireless communication method is slower than a predetermined speed, and
the communication performing unit performs the Internet communication by the second wireless communication method when the communication speed of the Internet communication performed by the second wireless communication method is faster than the predetermined speed.

2. The communication device according to claim 1, wherein
when performing the Internet communication by the combined communication, the communication performing unit transmits base station identification information for identifying a wireless base station, whose coverage area the communication device is located in, to a core network to which the wireless base station belongs, via the Internet communication by the second wireless communication method.

3. The communication device according to claim 2, wherein communication cost per unit traffic by the first wireless communication method is higher than communication cost per unit traffic by the second wireless communication method.

4. The communication device according to claim 2, wherein the first wireless communication method is a wireless communication method for using a licensed band, and
the second wireless communication method is a wireless communication method for using an unlicensed band.

5. The communication device according to claim 2, wherein the first wireless communication method is a wireless communication method for using a cellular communication method, and
the second wireless communication method is a wireless communication method for using a WiFi communication method.

6. The communication device according to claim 5, wherein when performing the Internet communication by the combined communication, the communication performing unit separately transmits a plurality of packets by the first wireless communication method and the second wireless communication method.

7. The communication device according to claim 2, wherein the communication performing unit performs the Internet communication by the combined communication when the Internet communication can be performed using the second wireless communication method and the combination permission setting is enabled.

8. The communication device according to claim 2, wherein the communication performing unit performs the Internet communication by the second wireless communication method when the combination permission setting is disabled.

9. The communication device according to claim 2, further comprising a determination unit for determining, by inquiring the user, whether to perform the Internet communication by the second wireless communication method, when the combination permission setting is enabled and when the communication speed of the Internet communication performed by the second wireless communication method is faster than the predetermined speed,
wherein when it is determined by the determination unit that the Internet communication is to be performed by the second wireless communication method, the communication performing unit performs the Internet communication by the second wireless communication method.

10. The communication device according to claim 2, wherein the predetermined speed is a communication speed of the Internet communication performed by the combined communication.

11. The communication device according to claim 2, further comprising a setting reception unit for receiving a setting for the Internet communication,
wherein the setting reception unit receives the combination permission setting set by the user.

12. The communication device according to claim 2, wherein in a case where the combination permission setting and a speed priority setting for giving priority to a communication speed are enabled, the communication performing unit performs the Internet communication by the second wireless communication method when the communication speed of the Internet communication performed by the second wireless communication method is faster than the predetermined speed, and performs the Internet communication by the combined communication when the communication speed of the Internet communication performed by the second wireless communication method is slower than the predetermined speed.

13. The communication device according to claim 2, wherein when the second wireless communication method cannot be performed, the communication performing unit performs the Internet communication by the first wireless communication method.

14. A communication device capable of performing Internet communication by any of a first wireless communication method and a second wireless communication method, the communication device comprising:
a communication performing unit for performing the Internet communication by combined communication of the first wireless communication method and the second wireless communication method, in accordance with establishment of a predetermined condition, wherein
when performing the Internet communication by the combined communication, the communication performing unit transmits base station identification information for identifying a wireless base station, whose coverage area the communication device is located in, to a core network to which the wireless base station belongs, via the Internet communication by the second wireless communication method, and
the communication performing unit performs the Internet communication by the combined communication when a combination permission setting for permitting a user of the communication device to perform the combined communication is enabled,
the communication device further comprising a setting reception unit for receiving a setting for the Internet communication, and a setting recommendation unit for recommending the combination permission setting to the user when a communication speed of the Internet communication performed by the second wireless communication method is slower than a predetermined speed, wherein
the setting reception unit receives the combination permission setting set by the user, and
the setting reception unit receives the combination permission setting set by the user in accordance with the combination permission setting recommended by the setting recommendation unit.

15. A non-transitory computer-readable storage medium having a program stored thereon, the program causing a computer capable of performing Internet communication by any of a first wireless communication method and a second wireless communication method to function as:
a communication performing unit for performing the Internet communication by combined communication of the first wireless communication method and the second wireless communication method, in accordance with establishment of a predetermined condition, wherein in a case where a combination permission setting is enabled,
the communication performing unit performs the Internet communication by the combined communication when a communication speed of the Internet communication performed by the second wireless communication method is slower than a predetermined speed, and
the communication performing unit performs the Internet communication by the second wireless communication method when the communication speed of the Internet communication performed by the second wireless communication method is faster than the predetermined speed.

16. The non-transitory computer-readable storage medium according to claim 15, wherein
when performing the Internet communication by the combined communication, the communication performing unit transmits base station identification information for identifying a wireless base station, whose coverage area the communication device is located in, to a core network to which the wireless base station belongs, via the Internet communication by the second wireless communication method.

17. A communication system capable of performing Internet communication by any of a first wireless communication method and a second wireless communication method, the communication system comprising:
a communication means for performing the Internet communication by combined communication of the first wireless communication method and the second wireless communication method, in accordance with establishment of a predetermined condition; and
a relay means for relaying communication between the communication means and the Internet by using the second wireless communication method, wherein
where the communication means transmits a base station identification information for identifying a wireless base station, whose coverage area the communication means is located in, to the relay means when performing the Internet communication by the combined communication,
the relay means transmits the base station identification information to a core network to which the wireless base station belongs, and
in a case where a combination permission setting for permitting a user of the communication device to perform the combined communication is enabled, the communication means performs the Internet communication by the combined communication when a communication speed of the Internet communication performed by the second wireless communication method is slower than a predetermined speed, and performs the Internet communication by the second wireless communication method when the communication speed of the Internet communication performed by the second wireless communication method is faster than the predetermined speed.

18. The communication system according to claim 17, wherein
the first wireless communication method is a wireless communication method for using a cellular communication method, and
the second wireless communication method is a wireless communication method for using a WiFi communication method.

19. The communication system of claim 17 wherein
the first wireless communication method is a wireless communication method for using a cellular communication method, and
the second wireless communication method is a wireless communication method for using a WiFi communication method.

20. A communication method performed by a communication device capable of performing Internet communication by any of a first wireless communication method and a second wireless communication method, the method comprising:
performing the Internet communication by combined communication of the first wireless communication method and the second wireless communication method, in accordance with establishment of a predetermined condition; and
transmitting, using the second wireless communication method, a base station identification information for identifying a wireless base station, whose coverage area the communication device is located in, when performing the Internet communication by the combined communication, wherein
the base station identification information is transmitted to a core network to which the wireless base station belongs, and
the performing the Internet communication includes, in a case where a combination permission setting for permitting a user of the communication device to perform the combined communication is enabled, performing the Internet communication by the combined communication when a communication speed of the Internet communication performed by the second wireless communication method is slower than a predetermined speed, and performing the Internet communication by the second wireless communication method when the communication speed of the Internet communication performed by the second wireless communication method is faster than the predetermined speed.

21. The communication method of claim 20 wherein
the first wireless communication method is a wireless communication method for using a cellular communication method, and
the second wireless communication method is a wireless communication method for using a WiFi communication method.

* * * * *